United States Patent Office 3,486,973
Patented Dec. 30, 1969

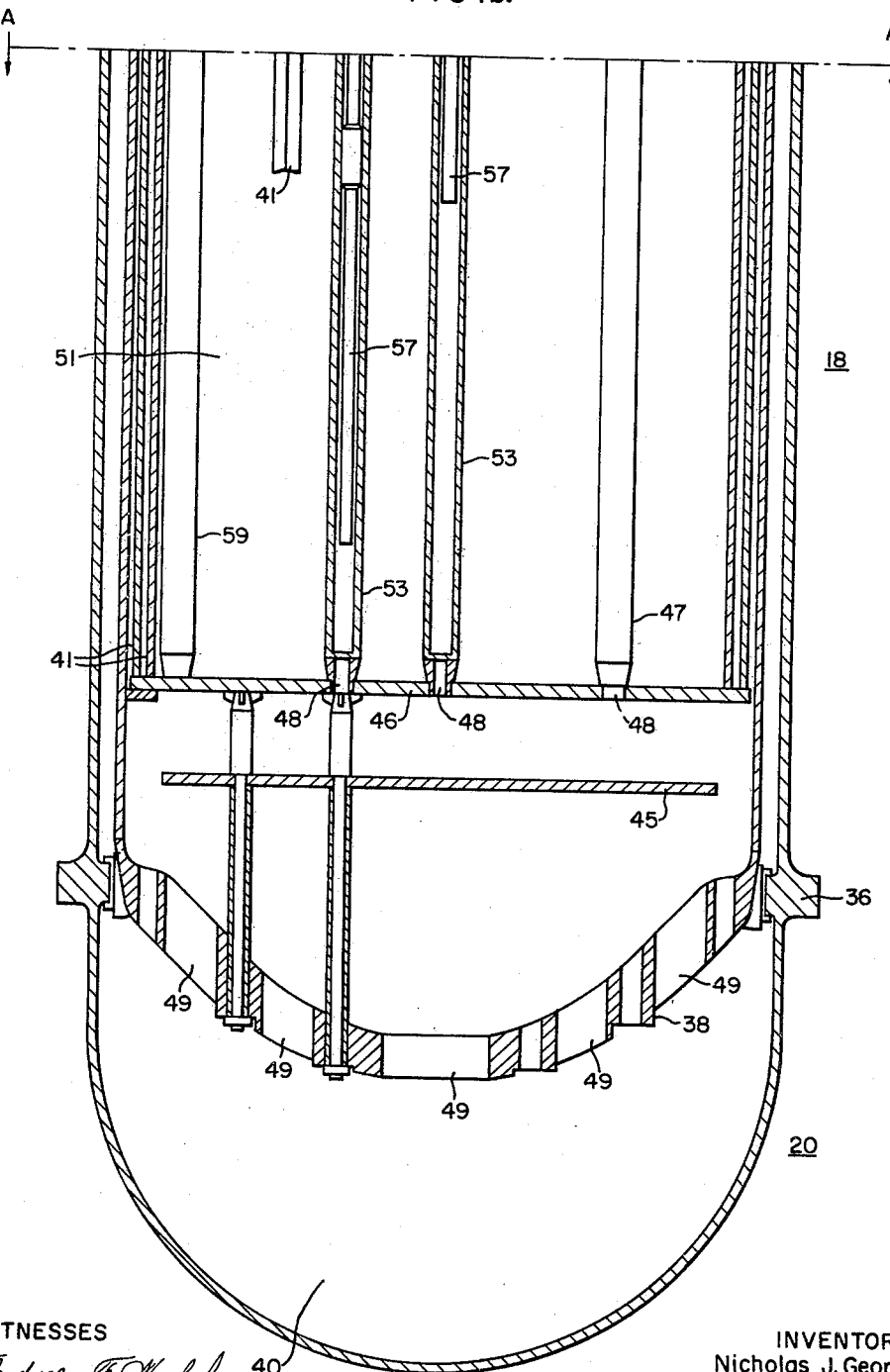

3,486,973
BREEDER REACTOR
Nicholas J. Georges, Pittsburgh, and Fred C. Engel, Penn Hills, Pa., assignors to Westinghouse Electric Corporation, Pittsburgh, Pa., a corporation of Pennsylvania
Filed Apr. 11, 1967, Ser. No. 630,007
Int. Cl. G21g 1/02
U.S. Cl. 176—18          7 Claims

ABSTRACT OF THE DISCLOSURE

A breeder reactor is disclosed wherein externally variable coolant flow regulation means are associated with an upper coolant manifold at the flow-exit side of the reactor core to compensate for the variable amount of heat generated in the fertile fuel section of the reactor core due to increasing amounts of fissile material being bred therein. The coolant flow regulation means comprises an annular plenum chamber which may have fixed orifices at its flow-entrance side associated with each breeder fuel assembly, and has relatively few externally variable flow regulation means at its flow-exit side.

BACKGROUND OF THE INVENTION

This invention relates to breeder reactors and more particularly to the problem of dissipating and effectively utilizing the variable amount of heat produced in the fertile fuel section of the reactor core. The coolant flow through such a reactor and especially through its fertile fuel section must be regulated to levels of safe and effective heat conduction. Practical solutions to this coolant-flow problem require consideration of corrosion, erosion, cavitation, differential pressures, ease of control, and access for maintenance.

Certain prior art breeder reactors dealt with the problem of variable heat production in their fertile fuel or breeder regions by providing a completely separate coolant inlet structure for these sections operating at a generally lower pressure. The regulating means could then take the form of a valve on the separate inlet conduit. For certain axial positions along the breeder fuel assembly coolant flow channels, bottom or inlet flow regulation inherently creates a lower pressure than the pressure created with top or outlet regulation of this invention. Since such reactors have a physical boundary between the breeder region and the high flow fissile region, the prior art arrangements cause a higher difference in pressure across this boundary and thus the stress acceptance level must be considerably higher.

This was presumably realized in other prior art arrangements where top regulation was adapted. These reactors, however, had no breeder regions, thus, the flow regulation problems could be solved by including an externally variable orifice in each fuel assembly. Such a solution, however, requires a large number of control elements to be brought through the shield plate of the reactor. Moreover, inasmuch as a large pressure drop is initially required in the breeder regions, severe problems of corrosion and erosion as well as cavitation limit the utility of such an orificing means and complicate its design for safe levels of operation.

A proper solution to this flow distribution problem should include top regulation to produce lower pressure differentials and ease in maintenance, and relatively few means which require external control and which are capable of producing both an initially high pressure drop and a wide range of flow selection for variable heat dissipation.

SUMMARY OF THE INVENTION

A breeder reactor may consist of three concentric regions of fuel elements, a fissile fuel region, a blanket region of fertile fuel, and a reflector region. Each of these regions require specific rates of coolant flow to conduct the heat therefrom and to maintain their structural integrity. The central fissile region develops the greatest amount of energy and therefore requires over 90% of the coolant flow at the beginning of life. This requirement varies very little and only decreases to about 82% of the total coolant flow at the end of the core life. In contrast, the coolant requirements for the blanket or fertile region more than doubles over the life of the reactor. The necessary flow distribution must therefore be achieved both by controlling the pressure drop in each flow path by suitably dimensioned orifice means in series with these fuel assemblies, and, because of the variable requirements of the blanket region, the orifice means in this region must necessarily be variable.

While within the different blanket concentric regions different amounts of heat are produced, the ratio of energy released at the beginning of life to that at the end of life is nearly the same for all these blanket fuel assemblies. Therefore, the flow distribution in individual blanket regions can be achieved by fixed orifices. The variation in the total blanket race, however, requires control. In accordance with this invention, the flow rates are properly distributed between the fissile region and the blanket region by separating the two coolant streams essentially by varying the flow resistance in the blanket section. This is done by placing an annular plenum chamber over the entire annular blanket or fertile region. At the entrance-side of this plenum, fixed orifices may be placed for achieving proper distribution among the individual regions for certain applications. At the exit-side of this plenum chamber variable orifices are positioned which essentially are in series with the fixed orifices (if used) and which are externally variable over the life of the core.

Because the flow rate of the coolant in the fissile assemblies is higher than that in the blanket or fertile assemblies, a differential pressure exists between the assemblies specifically at the boundary of these assemblies. The design requirements of this boundary region are in general severe. For this reason the required orificing should be done in such a manner as to produce the highest pressure consistent with a particular flow rate in the blanket region. This is achieved by top orificing as opposed to bottom orificing. Such a solution, it should be noted, is also consistent with maintenance requirements should an orificing means become defective.

Over the life of the fissile and blanket regions, and especially at the beginning of life, the variable orifice would have to supply a rather large pressure drop to reduce the blanket flow to the required portion of the total. Considerations of corrosion, erosion, as well as minimum velocities to cavitation, limit the flow acceptable in a single orifice throat. To obtain the desired differential, several throats and top-shaped plungers are placed in series. Such a reduction of the exit velocity also reduces the vessel height above the top of the core required for adequate mixing. Programming the plunger position with core life will establish the desired flow distribution.

DESCRIPTION OF THE DRAWINGS

For a better understanding of the invention, reference may be had to the accompanying drawings in which:

FIGS. 1a and 1b, when placed end to end, comprise a sectional view of the breeder reactor with the flow regulating means of this invention incorporated therein and taken substantially along the lines C—C of FIG. 3;

DESCRIPTION OF THE PREFERRED EMBODIMENT

Figure 1A:
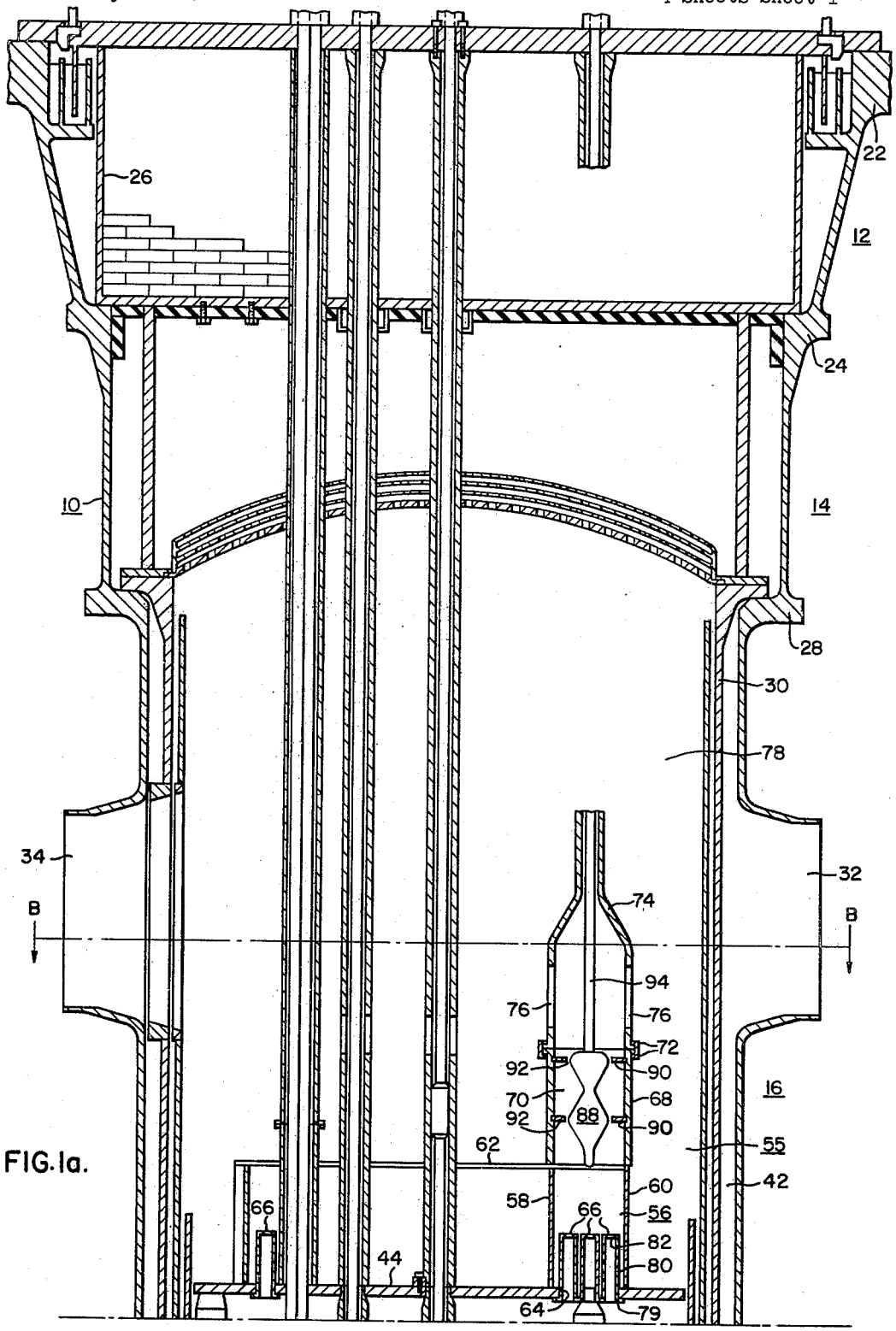

In FIGURE 1, a pressure vessel generally indicated by the numeral 10 is formed which includes five regions, i.e., a head receiving or adapter region 12, a vessel support region 14, an inlet-outlet and upper manifold region 16, a core receiving and shielding region 18, and a bottom closure and lower manifold region 20. The head adapter region 12 has two inwardly and outwardly extending flanges 22 and 24 which receive and support the shield plug or head 26. The support region 14 also has an inwardly and outwardly extending flange 28 from which the pressure vessel 10 is supportedly suspended in its concrete enclosure, and from which a core barrel 30 is supportedly mounted such that the weight of the core barrel is transferred to the concrete enclosure. The inlet-outlet region 16 has an inlet opening 32 and an outlet opening 34. Between the core shielding region 18 and the bottom closure region 20, a fourth inwardly and outwardly extending flange 36 is situated. This flange also supports the core barrel structure, and more specifically the core barrel bottom section 38.

Coolant flow, which enters through inlet opening 32, proceeds to the bottom manifold 40 through a bottom manifold access annulus 42 formed by the cylindrical wall of the pressure vessel 10 and the cylindrical wall of the core barrel 30. Two axially spaced core plates 44 and 46 are supported within the core barrel 30 and extend substantially perpendicular to the walls of said core barrel. A plurality of elongated assemblies, some containing a plurality of parallel fuel elements (not shown), are mounted in parallel relation each of the other, and fixedly positioned between the core plates 44 and 46, as will be described. Openings 48 in the lower core plate 46 enable the fluid which has passed through openings 49 in the core barrel bottom section 38 to pass through mixer means 45 into the core region 51. Coolant enters the fuel assemblies in both the blanket region and the fissile region from lower manifold 40 in this manner.

Since in a breeder reactor of this invention there are normally at least two different types of fuel assemblies as to their heat propagating properties, their resistance to flow should be matched to produce as uniform a mixed mean outlet temperature as possible across the entire core region. This necessitates the placement of additional flow resistance means in the flow path of the fertile blanket or breeder fuel assemblies so that the lower flow rate thereby produced will allow for more heating of the coolant as will be described hereinafter.

Figure 2:
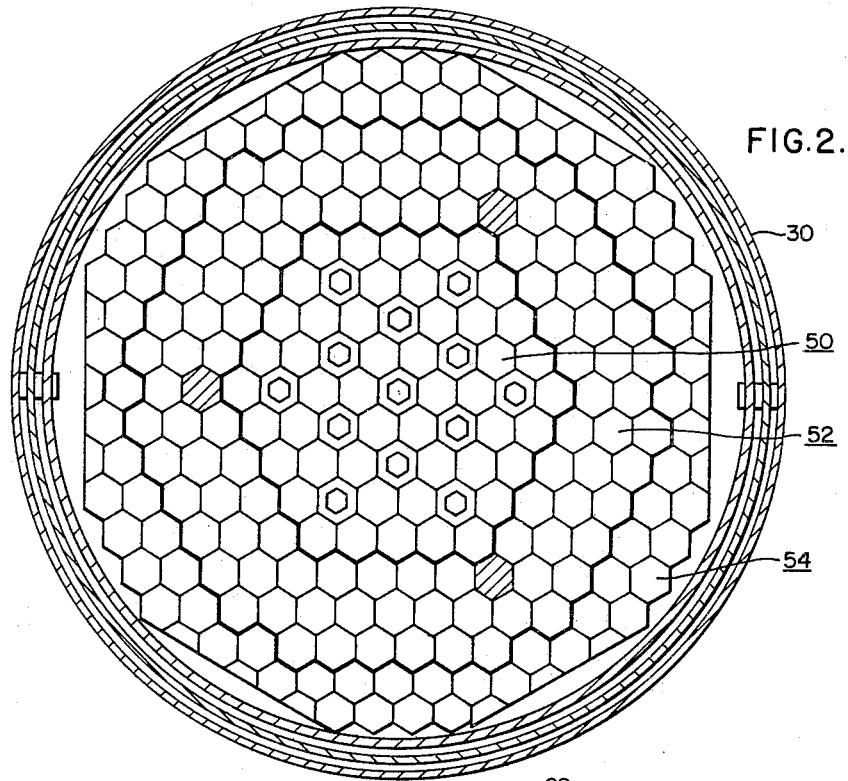
FIG. 2 is a sectional view taken along line A—A of FIG. 1.

Referring now to FIG. 2, there is shown the general arrangement of the core region 51. Three concentric regions are shown, a fissile region 50, a blanket or fertile region 52, and a reflector region 54. Although not forming an essential part of this invention, it will be noted that the fuel assemblies (not shown) of the fissile region 50 of this embodiment are canless, i.e., the fuel rods are held together in a fixed manner but not contained within a can or outer enclosure. Additional mixing is thereby achieved. The fuel assemblies 47 of the fertile region 52 desirably are canned and the cans or outer enclosures act to segregate the flow by restricting it to discrete flow paths within these cans. The reflector region 54 is made of packets of a material having a property of reflecting neutrons such as Inconel, and desirably having the outward configuration of the breeder region fuel assemblies 47. The reflector assemblies may have coolant channels formed therein to prevent overheating.

The axial configuration of the fuel and reflector assemblies is seen more clearly in FIGS. 1a and 1b wherein only one fuel assembly 47 for the blanket region 52 is shown. The reactor core includes a number of fuel assemblies 53 which are formed to receive movable control rods 57, only two assemblies 53 being shown. In addition the reactor core includes a plurality of support columns 41 and reflector assemblies 59.

Figure 4:
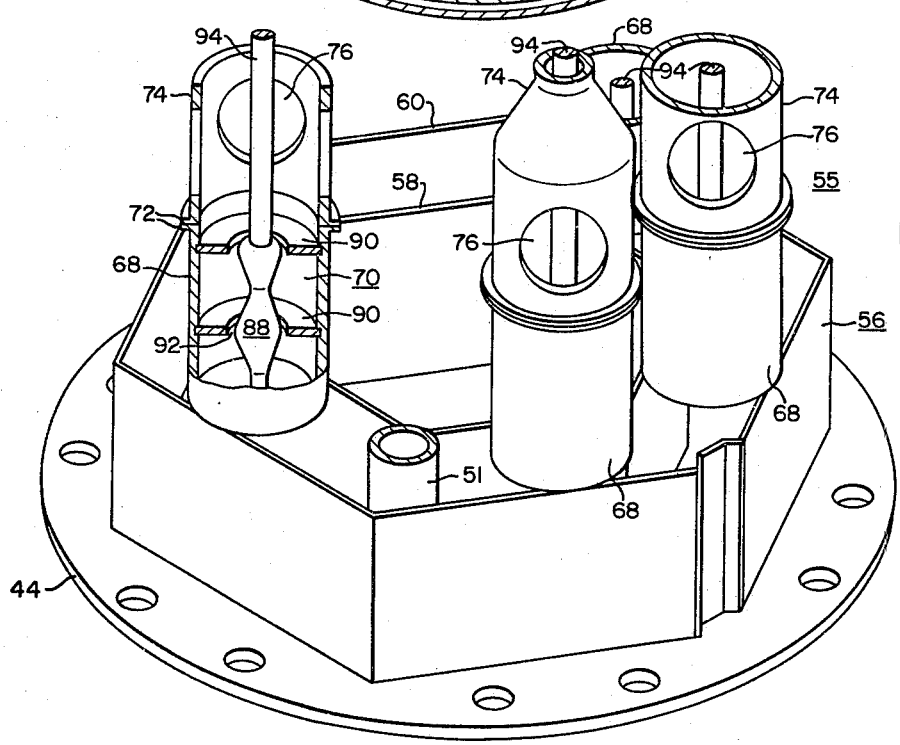
FIG. 4 is an isometric view of the flow regulating means of FIGS. 1 and 3.
Figure 3:
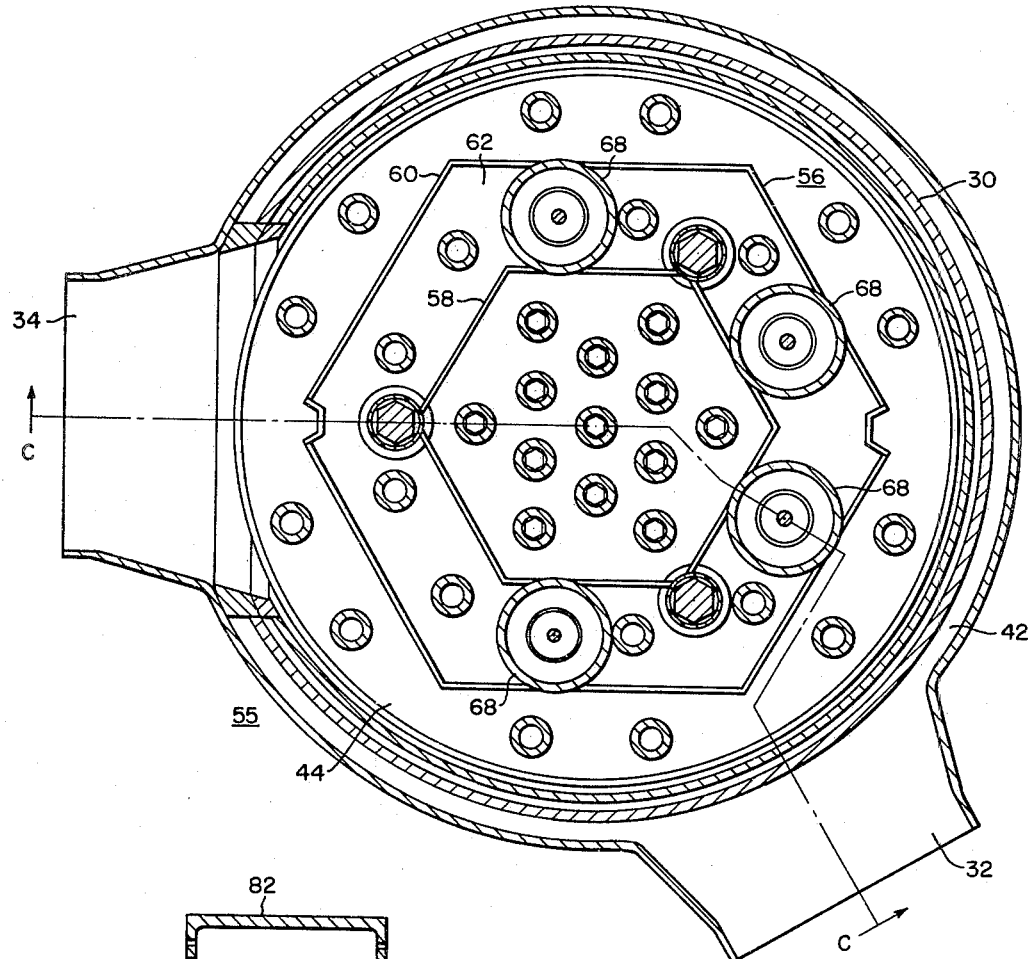
FIG. 3 is a sectional view taken along line B—B of FIG. 1.

Referring now to FIGS. 1, 3 and 4, flow regulating means generally indicated by the numeral 55 for the blanket region will be described. An annular plenum chamber 56 is supported by the upper core plate 44 which forms the lower side thereof. The annular plenum chamber 56 may be constructed from two upright and generally concentric hexagonally shaped members 58 and 60. A plate 62 forms the top of this chamber. Flow entering the blanket fuel assemblies 47, through the openings 48, exits from the fuel assemblies 47 and enters the plenum chamber 56 through holes generally indicated by the numeral 64 in the upper core plate 44. Flow-coupled with each fuel assembly 47 in the blanket region 52 is a fixed orifice means 66 supportedly mounted in the holes 64, as will be described. Mounted on the top plate 62 of the generally annular shaped plenum chamber 56 are a number of open cylinders 68 in which variable linear orifice means 70 are contained and flow-coupled with the chamber 56, as will be described. These open ended cylinders 68 are joined by juxtaposed flanges 72 to upper structure channels 74 which have relatively large holes 76 in the lower cylindrical walls thereof to allow the flow to exit from the coolant flow regulating means 55 into an upper manifold 78. The flow exiting from the regulating means 55 is mixed with the flow exiting from the core region 50 in the upper manifold 78. After mixing, the flow passes through outlet openings 34 to conversion means (not shown) for ultimate conversion of the heat absorbed during the passage of the coolant through the fuel assemblies into a more useful form of energy.

Figure 5:
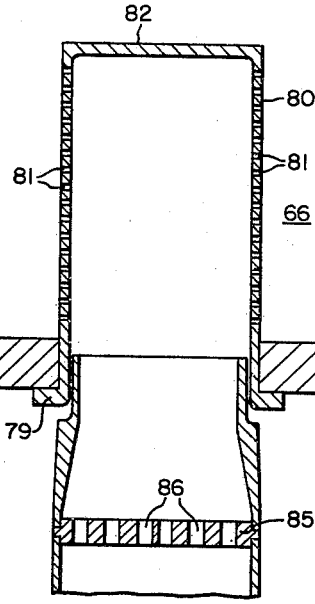
FIG. 5 is an enlarged sectional view of the fixed orifice of FIG. 1.

The fixed orifice 66 of FIG. 5, referred to above, in this example, comprises cylindrical members 80 having a relatively large number of relatively small holes 81 through which fluid passes. The top of the fixed orifice 66 is closed by a circular plate 82. Its bottom is open and has outwardly extending flanges 79 at its extremity which abut the bottom surface of the upper core plate 44. As can be seen, the upper portion of the fuel assemblies 47 are constructed so as to be closely received within the lower portions of the fixed orifices 66. The upper portion of the fuel assemblies 47 may include an orificing plate 85 with a number of orificing holes 86 therein.

The linear orificing means 70, as shown in FIGS. 1a and 4, includes two or more top-shaped members 88 which may be joined end-to-end. Members 88 coact with orificing throat-plates 90 to restrict the flow passing through the holes 92 therein. The linear orificing device 70 is shown in its most restrictive position in FIG. 1. Inasmuch as the top-shaped members 88 are more narrow towards their lower ends, they tend to serve as successively less restrictive members as their vertical position is raised from that shown in the aforementioned figure. For the purpose of externally varying the position of members 88, control elements 94 are provided which extend through the upper channel structure 74 and through the shield plug 26 to manual or machine means which may be automatically actuated.

By way of example, the fixed orifices 66 may reduce the flow through the blanket region fuel assemblies to 25% of the maximum value. The variable orificing means 70 may then be used to further reduce this flow to as little as 5% of the maximum value. As can be seen, a relatively wide range 5% to 25% of the maximum flow value can be achieved with relatively few externally variable linear orificing means 70; four in the embodiment shown. It will be noted that the flow through the fissile region fuel assemblies 43 and 53, of this example is neither restricted by fixed orifices, such as those designated by the numeral 66, nor variable orifices, such as those designated by the numeral 70, but is unrestricted as it flows through the regions surrounded by the central upright hexagonal member 58. This latter flow, of course, mixes with the flow exiting from the coolant flow regulating means 55 which exits through openings or holes 76.

While there have been shown and described what is at present considered to be the preferred embodiment of the invention, modifications thereto will readily occur to those skilled in the art. In particular, inasmuch as the particular flow rate acceptable to a single variable orifice member 88 is dictated by considerations of corrosion, erosion and cavitation, more than the two such members shown might be required in a particular reactor. It is not desired, therefore, that the invention be limited to the specific illustrative arrangement shown and described, but rather it is intended to cover in the appended claims all such modifications as fall within the true spirit and scope of the invention.

Therefore we claim:

1. A nuclear reactor comprising, in combination, a vessel having coolant inlet and outlet means therein, a reactor core fixedly positioned within said vessel between an upper coolant manifold and a lower coolant manifold, said reactor core including a plurality of fertile fuel assemblies having coolant flow channels therethrough, means flow-coupling said inlet means to said lower coolant manifold and said outlet means to said upper coolant manifold whereby a flow path is established from said inlet means to said lower coolant manifold through said reactor core to said upper manifold and to said outlet means, a plenum chamber flow-coupled to at least two of said fertile fuel assemblies, and at least one variable flow regulating means flow-coupling said plenum chamber with said upper manifold.

2. The nuclear reactor of claim 1 wherein a plurality of variable flow regulating means are provided, said last mentioned plurality being fewer in number than the said plurality of fuel assemblies.

3. The nuclear reactor of claim 2 wherein means external to the pressure vessel are provided for varying the flow through said number of variable flow regulating means.

4. The nuclear reactor of claim 3 wherein a number of fixed orifices are additionally flow-coupled to said plenum chamber.

5. The nuclear reactor of claim 4 wherein one of said fixed orifices is flow-coupled with each fuel assembly at the flow-entrance to said plenum chamber, and said variable flow regulating means is situated at the flow-exit from said plenum chamber.

6. The nuclear reactor of claim 5 wherein said variable flow regulating means includes at least two linear orifices.

7. The nuclear reactor of claim 6 wherein said linear orifices are in series with each other.

References Cited

UNITED STATES PATENTS

| 3,036,965 | 5/1962 | Braun | 176—68 |
| 3,060,111 | 10/1962 | Sherman et al. | 176—61 |
| 3,280,001 | 10/1966 | Stacey et al. | 176—61 |
| 3,296,085 | 1/1967 | Peck et al. | 176—61 |

OTHER REFERENCES

Directory of Nuclear Reactors, vol. IV, Power Reactors, pp. 307–312.

U.S. Cl. X.R.

176—43, 61, 64